United States Patent
Hamilton, II et al.

(10) Patent No.: US 7,472,246 B2
(45) Date of Patent: Dec. 30, 2008

(54) METHOD AND SYSTEM FOR AUTOMATED MEMORY REALLOCATING AND OPTIMIZATION BETWEEN LOGICAL PARTITIONS

(75) Inventors: Rick Allen Hamilton, II, Charlottesville, VA (US); James Wesley Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 391 days.

(21) Appl. No.: 10/427,406

(22) Filed: Apr. 30, 2003

(65) Prior Publication Data

US 2004/0221121 A1 Nov. 4, 2004

(51) Int. Cl.
*G06F 12/00* (2006.01)
(52) U.S. Cl. ........................... 711/170; 711/112
(58) Field of Classification Search .................. 711/113
See application file for complete search history.

(56) References Cited

U.S. PATENT DOCUMENTS

| | | | | |
|---|---|---|---|---|
| 4,603,382 A | 7/1986 | Cole et al. | ................... | 364/200 |
| 5,504,670 A | 4/1996 | Barth et al. | ................... | 364/134 |
| 5,875,464 A | 2/1999 | Kirk | .......................... | 711/129 |
| 5,889,989 A | 3/1999 | Robertazzi et al. | .......... | 395/675 |
| 5,978,583 A | 11/1999 | Ekanadham et al. | ........ | 395/703 |
| 6,061,761 A * | 5/2000 | Bachmat | ..................... | 711/114 |
| 6,199,075 B1 | 3/2001 | Ungar et al. | ................ | 707/206 |
| 6,321,373 B1 | 11/2001 | Ekanadham et al. | ........... | 717/1 |
| 6,327,587 B1 | 12/2001 | Forster | .......................... | 707/2 |
| 6,366,945 B1 | 4/2002 | Fong et al. | .................. | 709/104 |
| 6,378,039 B1 * | 4/2002 | Obara et al. | ................. | 711/114 |
| 6,694,419 B1 * | 2/2004 | Schnee et al. | ................ | 711/173 |
| 6,968,441 B1 * | 11/2005 | Schnee | ........................ | 711/173 |
| 7,003,597 B2 * | 2/2006 | Georgiou et al. | .............. | 710/56 |
| 2001/0007557 A1 * | 7/2001 | Yamada et al. | .............. | 370/389 |
| 2002/0178337 A1 | 11/2002 | Wilson et al. | ................ | 711/173 |
| 2003/0005215 A1 | 1/2003 | Arimilli et al. | .............. | 711/105 |
| 2004/0078541 A1 * | 4/2004 | Lightstone et al. | .......... | 711/171 |

* cited by examiner

*Primary Examiner*—Tuan V. Thai
*Assistant Examiner*—Ryan Dare
(74) *Attorney, Agent, or Firm*—Duke W. Yee; David A. Mims, Jr.; Rudolf O. Siegesmund

(57) ABSTRACT

A method and system for reallocating memory in a logically partitioned environment. The invention comprises a Performance Enhancement Program (PEP) and a Reallocation Program (RP). The PEP allows an administrator to designate several parameters and identify donor and recipient candidates. The RP compiles the performance data for the memory and calculates a composite parameter. For each memory block in the donor candidate pool, the RP compares the composite parameter to the donor load threshold to determine if the memory is a donor. For each memory block in the recipient candidate pool, the RP compares the composite parameter to the recipient load threshold to determine if the memory is a recipient. The RP calculates the recipient workload ratio and allocates the memory from the donors to the recipients. The RP monitors and update the workload statistics based on either a moving window or a discrete window sampling system.

5 Claims, 4 Drawing Sheets

METHOD AND SYSTEM FOR AUTOMATED MEMORY REALLOCATING AND OPTIMIZATION BETWEEN LOGICAL PARTITIONS

FIELD OF THE INVENTION

The present invention is related generally to method for increasing computer system efficiency and specifically to a computer program for reallocating memory amongst virtual systems.

BACKGROUND OF THE INVENTION

A computer system is a collection of computer components, such as memory, which work together to perform a specific task, and is well known in the art. The computer systems may be located in a single computer, such as a server, or in a plurality of computers, such as a computer network. System administrators (hereinafter, administrators) are people who setup and manage computer systems. One of the tools used by administrators to increase the performance of a computer system is physical partitioning. Administrators physically partition a managed system by dedicating buses and predefined physical modules within the system to assist in creating the smaller partitioned systems, referred to as virtual systems. Each virtual system in a managed system appears to the end user as a completely separate system. In addition, virtual systems improve administrative flexibility and application performance.

Another method used by administrators to increase system performance is logical partitioning. Logical partitioning is a process which creates logical partitions within the managed system. Logical partitioning is distinct from physical partitioning in that there are no physically separated buses, memory, or processors in a logically partitioned system. Instead, the virtual systems are separated only by the system software. Similar to the physically partitioned system, each individual virtual system created by logical partitioning appears to the end user as a completely separate system. One advantage of logical partitioning is that logical partitioning permits much finer granularity in virtual system creation, such that any processor, memory, or adapter may be easily added or removed from a virtual system. Logical partitioning is generally controlled by a hardware management console outside of the managed system. The hardware management console controls the division of the managed system into the virtual systems and, if necessary, the reallocation of resources amongst the various virtual systems.

Recently, administrators have been able to move system hardware resources within the managed system with increased flexibility. When the reallocation occurs without having to reboot the managed system, the logical partitioning is known as dynamic logical partitioning. The prior art methods of dynamic reallocation require the system administrator to recognize the need for reallocation, and then manually reallocate the resources. For example, in a system comprising a first logical partition having eight gigabytes (GB) of memory and a second logical partition also having eight GB of memory, the administrator may observe that during a peak memory-intensive period, the first logical partition is experiencing heavy paging activity while the second logical partition is experiencing light paging activity. Upon observing the disparity in memory paging activity, the administrator may manually move some amount of memory from the second logical partition to the first logical partition to improve system performance during the peak memory-intensive period. Therefore, a need exists for a system and method to automate the control and movement of resources in a dynamic logical partitioning environment.

The need for automation within the reallocation process has been addressed by the prior art. U.S. Pat. No. 4,603,382 (the '382 patent) entitled "Dynamic Buffer Reallocation" discloses a method for dynamically reallocating data storage segments within a storage device. The '382 patent monitors the properties of the data storage device and reallocates the buffer segments when they exceed a predefined threshold. U.S. Pat. No. 5,875,464 (the '464 patent) entitled "Computer System with Private and Shared Partitions in Cache" discloses a partitioned cache memory buffer which monitors the allocation of tasks. The memory buffer of the '464 patent reallocates the tasks when necessary. U.S. Pat. No. 5,978,583 (the '583 patent) discloses a method of reallocating applications during the course of their execution. The method disclosed in the '583 patent monitors the applications and redistributes the applications when necessary based on various criteria. U.S. Pat. No. 6,366,945 (the '945 patent) entitled "Flexible Dynamic Partitioning of Resources in a Cluster Computing Environment" discloses a method for dynamic partitioning of a computer network. The method of the '945 patent monitors the resources within the virtual networks and moves resources among networks when required. However, the '945 patent is limited in that it does not disclose a method for dynamic logical partitioning of a managed network. Consequently, what is needed beyond the '382, '464, '583, and '945 patents is a method and system for dynamic logical partitioning of a managed system. Furthermore, a need exists for a method and system for reallocating resources among the computers within a virtual system.

SUMMARY OF THE INVENTION

The present invention, which meets the needs stated above, is a method and system for reallocating memory in a logically partitioned environment. The software embodiment of the present invention comprises a Performance Enhancement Program (PEP) and a Reallocation Program (RP). The PEP allows an administrator to designate a performance parameter, a capture interval, a sampling interval, a donor candidate pool, a recipient candidate pool, a donor load threshold, a recipient load threshold, a memory grain, and a memory multiplier. The RP compiles the performance data for the memory and calculates a composite parameter. For each memory block in the donor candidate pool, the RP compares the composite parameter to the donor load threshold to determine if the memory is a donor. For each memory block in the recipient candidate pool, the RP compares the composite parameter to the recipient load threshold to determine if the memory is a recipient. RP then determines if memory reallocation is necessary. If reallocation is necessary, the RP calculates the recipient workload ratio and allocates the memory from the donors to the recipients. The RP continues to monitor and update the workload statistics based on either a moving window or a discrete window sampling system. The partitioned system of the present invention does not require a reboot to reallocate memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
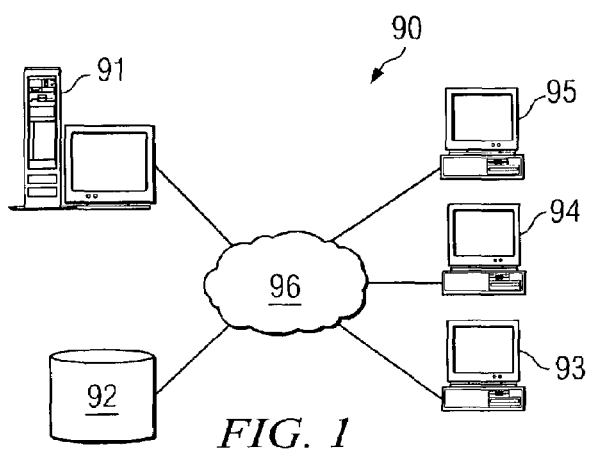
FIG. 1 is an illustration of a computer network used to implement the present invention.

As used herein the term "computer" shall mean a machine having a processor, a memory, and an operating system, capable of interaction with a user or other computer, and shall include without limitation desktop computers, notebook computers, personal digital assistants (PDAs), servers, handheld computers, and similar devices.

As used herein, the term "managed system" means a collection of hardware components, such as processors, which work together to accomplish a specific task. The hardware components may be located in a single computer or in a plurality of networked computers.

As used herein, the term "memory" means a device where information can be stored and retrieved. The term memory includes internal and external storage devices and includes magnetic and optical disks, magnetic tape, compact disc, as well as random access memory (RAM) and read only memory (ROM). For memory that is stored en mass (i.e. RAM comprising many 64 MB chips) as opposed discrete units (i.e. a compact disc), a single memory unit (i.e. the 64 MB chip) is referred to as a memory block.

As used herein, the term "performance parameter" means one or more parameters used to measure the workload on a memory block. Performance parameters include available memory, paging activity, pages in, or pages out. Other performance parameters are known by persons skilled in the art. Performance parameters may also include a combination of several individual performance parameters.

As used herein, the term "available memory" means the physical memory cards or chips within a given system or virtual system which are not currently in use and are available for use by system processes and applications.

As used herein, the term "paging activity" means the number of pages read into a distinct amount of memory over a given time period. For example, paging activity could be the number of pages read into 64 MB of memory per second.

As used herein, the term "pages out" means the process of writing memory pages to a disk or other similar media when an application requires more memory space than is available in the system memory. The oldest/least-used memory pages are sent to disk if necessary during the 'page out' phase freeing up memory for currently active processes.

As used herein, the term "pages in" means the process of reading memory pages from a disk back into the system memory.

As used herein, the term "donor candidate" means a system which is designated by a user as eligible to donate memory to another system. The group of all donor candidates is referred to as the donor candidate pool. Assuming a direct correlation between the performance parameter and the donor load threshold, a donor candidate will become a donor if the system's composite parameter is less than the donor load threshold.

As used herein, the term "donor" means a system which has a composite parameter less than the donor load threshold, assuming that there is a direct correlation between the performance parameter and the donor load threshold. The group of all donors is referred to as a donor pool.

As used herein, the term "recipient candidate" means a system which is designated by a user as eligible to receive memory from another system. The group of all recipient candidates is referred to as the recipient candidate pool. Assuming a direct correlation between the performance parameter and the recipient load threshold, a recipient candidate will become a recipient if the system's composite parameter is greater than the recipient load threshold.

As used herein, the term "recipient" means a system which has a composite parameter greater than the recipient load threshold, assuming that there is a direct correlation between the performance parameter and the recipient load threshold. The group of all recipients is referred to as a recipient pool.

As used herein, the term "donor load threshold" means a specific performance parameter level below which a donor may provide memory to a recipient, assuming that there is a direct correlation (i.e. increasing the performance parameter makes the memory less efficient) between the performance parameter and the donor load threshold. If there is an inverse correlation between the performance parameter and the donor load threshold (i.e. increasing the performance parameter makes the memory more efficient), then the donor load threshold would be a specific performance parameter above which a donor may provide memory to a recipient.

As used herein, the term "recipient load threshold" means a specific performance parameter level above which a recipient may receive memory from a donor, assuming that there is a direct correlation (i.e. increasing the performance parameter makes the memory less efficient) between the performance parameter and the recipient load threshold. If there is an inverse correlation between the performance parameter and the recipient load threshold (i.e. increasing the performance parameter makes the memory more efficient), then the recipient load threshold would be a specific performance parameter below which a recipient may receive memory from a donor.

As used herein, the term "conditioning interval" means the period during which no memory reallocation will transpire. Sampling statistics may or may not be collected during this period, but no action will be taken upon these statistics until completion of the conditioning interval.

As used herein, the term "capture interval" means the interval at which statistics are collected on memory performance for various systems. The capture interval is any interval shorter than or equal to the sampling interval.

As used herein, the term "sampling interval" means the window of time over which sample statistics are captured. The sampling interval is equal to or greater than the capture interval. For example, statistics might be captured every five seconds for a five minute sampling interval. In that case, sixty statistical samples would be available at the end of the sampling interval. The sampling interval can be implemented as either a moving window or a discrete window.

As used herein, the term "moving window" means that, for each new performance parameter value which is added to the collection of samples, the oldest performance parameter value, formerly within the sampling interval, falls out of consideration. The advantage of using a moving window, vis-a-vis a discrete window, is that the moving window provides greater responsiveness in providing memory resources when and where they are needed. The use of a moving window normally requires computation of the composite parameter once for each sample taken.

As used herein, the term "discrete window" means that the sampling window is reset on a regular basis and those samples are considered in individual, non-overlapping time periods. The advantage of using a discrete window, vis-à-vis a moving window, is that the discrete window requires fewer processing resources because the composite parameter is only calculated once per sampling interval.

As used herein, the term "composite parameter" means the average of the memory data accumulated over the sampling interval. The average used to calculate the composite parameter may be the mean, median, mode, or norm. Smoothing criteria may optionally be used to determine the composite parameter. An example of smoothing would be removing the high and low values of the data collected during the sampling interval.

As used herein, the term "recipient workload ratio" is equal to the composite parameter divided by the recipient load threshold. The recipient workload ratio measures the extent to which the composite parameter exceeds the recipient load threshold.

As used herein, the term "memory grain" means the smallest amount of memory which may be transferred between systems. The memory grain is the finest granularity of memory which may be reallocated from a donor to a recipient.

As used herein, the term "memory multiplier" means a table specifying the number of memory grains to transfer based on the recipient workload ratio. An example of a memory multiplier would be:

| For a recipient workload ratio of: | Transfer this many memory grains: |
|---|---|
| 1.000 to 1.001 | 1 |
| 1.001 to 1.01 | 2 |
| 1.01 to 1.1 | 3 |
| More than 1.1 | 4 |

As used herein, the term "controlling entity" means the computational device, either internal or external to the managed system, which manages the reallocation of memory. In a UNIX environment, this is known as the Hardware Management Console.

FIG. 1 is an illustration of computer network 90 associated with the present invention. Computer network 90 comprises local machine 95 electrically coupled to network 96. Local machine 95 is electrically coupled to remote machine 94 and remote machine 93 via network 96. Local machine 95 is also electrically coupled to server 91 and database 92 via network 96. Network 96 may be a simplified network connection such as a local area network (LAN) or may be a larger network such as a wide area network (WAN) or the Internet. Furthermore, computer network 90 depicted in FIG. 1 is intended as a representation of a possible operating network that may contain the present invention and is not meant as an architectural limitation.

Figure 2:
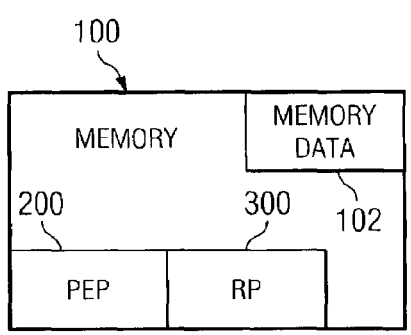
FIG. 2 is an illustration of the memory used to implement the present invention.

The internal configuration of a computer, including connection and orientation of the memory, memory, and input/output devices, is well known in the art. The present invention is a methodology that can be embodied in a computer program. Referring to FIG. 2, the methodology of the present invention is implemented on software by Performance Enhancement Program (PEP) 200. PEP 200 includes Reallocation Program (RP) 300. PEP 200 and RP 300 described herein can be stored within the memory of any computer depicted in FIG. 1. Alternatively, PEP 200 and RP 300 can be stored in an external storage device such as a removable disk or a CD-ROM. Memory 100 is illustrative of the memory within one of the computers of FIG. 1. Memory 100 also contains memory data 102. The present invention may interface with memory data 102 through memory 100. As part of the present invention, the memory 100 can be configured with PEP 200 and/or RP 300.

In alternative embodiments, PEP 200 and/or RP 300 can be stored in the memory of other computers. Storing PEP 200 and/or RP 300 in the memory of other computers allows the processor workload to be distributed across a plurality of processors instead of a single processor. Further configurations of PEP 200 and/or RP 300 across various memories are known by persons skilled in the art.

Figure 3:
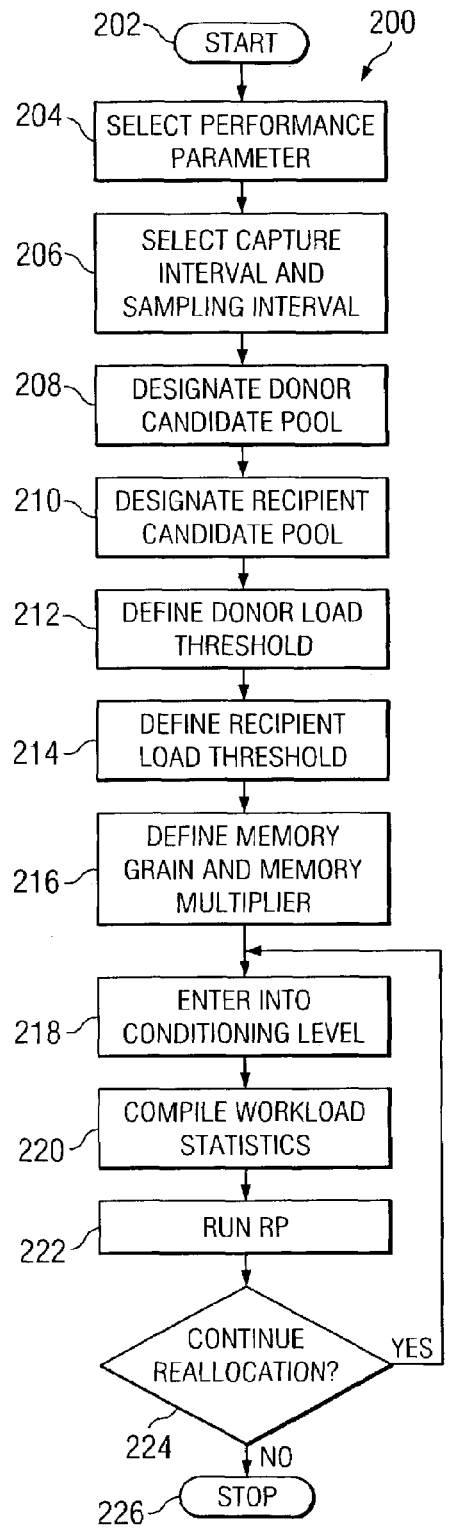
FIG. 3 is an illustration of the Performance Enhancement Program (PEP) of the present invention.

Turning to FIG. 3, a flowchart of the logic of PEP 200 is illustrated. PEP 200 is a program which allows the user to designate performance enhancement criteria. The user described herein may be, for example, a system administrator. PEP 200 starts (202) and the user selects at least one performance parameter (204). The performance parameter is used by RP 300 to measure the workload on the memory. The user then defines the capture interval and the sampling interval (206). The capture interval and the sampling interval are used by RP 300 to develop memory data for memory reallocation. The user then designates the donor candidate pool (208). In designating the donor candidate pool, the user selects the memory blocks which are eligible to be donors. Donor candidates are generally systems whose performance is of relatively low importance when compared to other systems. Donor candidates may be either test or development systems, or they could be applications of secondary criticality when compared with the criticality of the recipient candidates. Generally, all of the memory would be selected as potential donors unless the user wants to specifically exclude certain memory. The user then designates the recipient candidate pool (210). In designating the recipient candidate pool, the user selects the memory blocks which are eligible to be recipients. Recipient candidates are systems with relatively high priority or importance. Generally, all of the memory would be selected as potential recipients unless the user wants to specifically exclude certain memory.

The user then defines the donor load threshold (212). The donor load threshold is used by RP 300 to determine when a donor candidate becomes a donor. A heavily loaded donor will not donate memory unless its threshold value is set very high. The load threshold increases as system performance goes down, so that only a donor with a low load (i.e. relatively strong performance) may donate memory. The threshold may be set to provide whatever degree of flexibility is desired by the user. For example, if the performance parameter is the paging activity, the performance parameter limit might be set at fifty pages per second. Thus, when a memory block has less than fifty pages per second, the memory block will be identified as a potential donor.

The user then defines the recipient load threshold (214). The recipient load threshold is used by RP 300 to determine when a recipient candidate becomes a recipient. A lightly loaded recipient will not receive memory unless its threshold value is set very low. As the load on the recipient system increases, the performance of the recipient system goes down, thus making the slow-running recipient candidate ripe for memory addition. For example, if the performance parameter is the paging activity, the performance parameter limit might be set at sixty pages per second. Thus, when a memory block has more than sixty pages per second, the memory block will be identified as a potential recipient.

The user then defines the memory grain and the memory multiplier (216). RP 300 uses the memory grain and the memory multiplier to determine how much memory to transfer from the donor to the recipient. The administrator will want to set the memory grain relatively low compared to the overall memory so that an excess amount of memory will not be taken away from the donor. However, if the memory grain is made too low, then a transfer of memory from the donor to the recipient will not have a substantial effect on the needs of the recipient. The memory multiplier helps alleviate this problem.

Memory is distinguishable from other computer asset classes, such as processors, because memory is not confined to discrete, easily quantifiable units. Instead, memory appears in mass amounts, such as 64 MB units, which are often used in large quantities to create a memory bank. For example, it would not be uncommon for seven hundred fifty (750)-64 MB memory units to be installed in a server to create a 48 GB memory bank. If a recipient needs 4 GB of memory and the sampling interval is two minutes, then it would take over four hours to transfer 4 GB of memory using 64 MB increments. The memory multiplier solves this problem by transferring increasing amounts of memory to a recipient who has a substantial need for memory. Therefore, the memory grain and the memory multiplier allow RP 300 to transfer the appropriate amount of memory from the donor to the recipient based on the needs of the recipient.

PEP 200 then enters into a conditioning level (218). During the conditioning level, the memory reallocation is temporarily suspended between the donors and the recipients. During the conditional period, PEP 200 optionally compiles the workload statistics for the memory in the donor pool and in the recipient pool (220). If the workload statistics are compiled, then there may be some overlap between the data in the workload statistics and the data in the sampling interval. PEP 200 then runs RP 300 (222). PEP 200 then makes a determination whether to continue the memory reallocation (224). If the user wants to continue memory reallocation, PEP 200 returns to step 218. If the user does not want to continue memory reallocation, PEP 200 ends (226).

Figure 4:
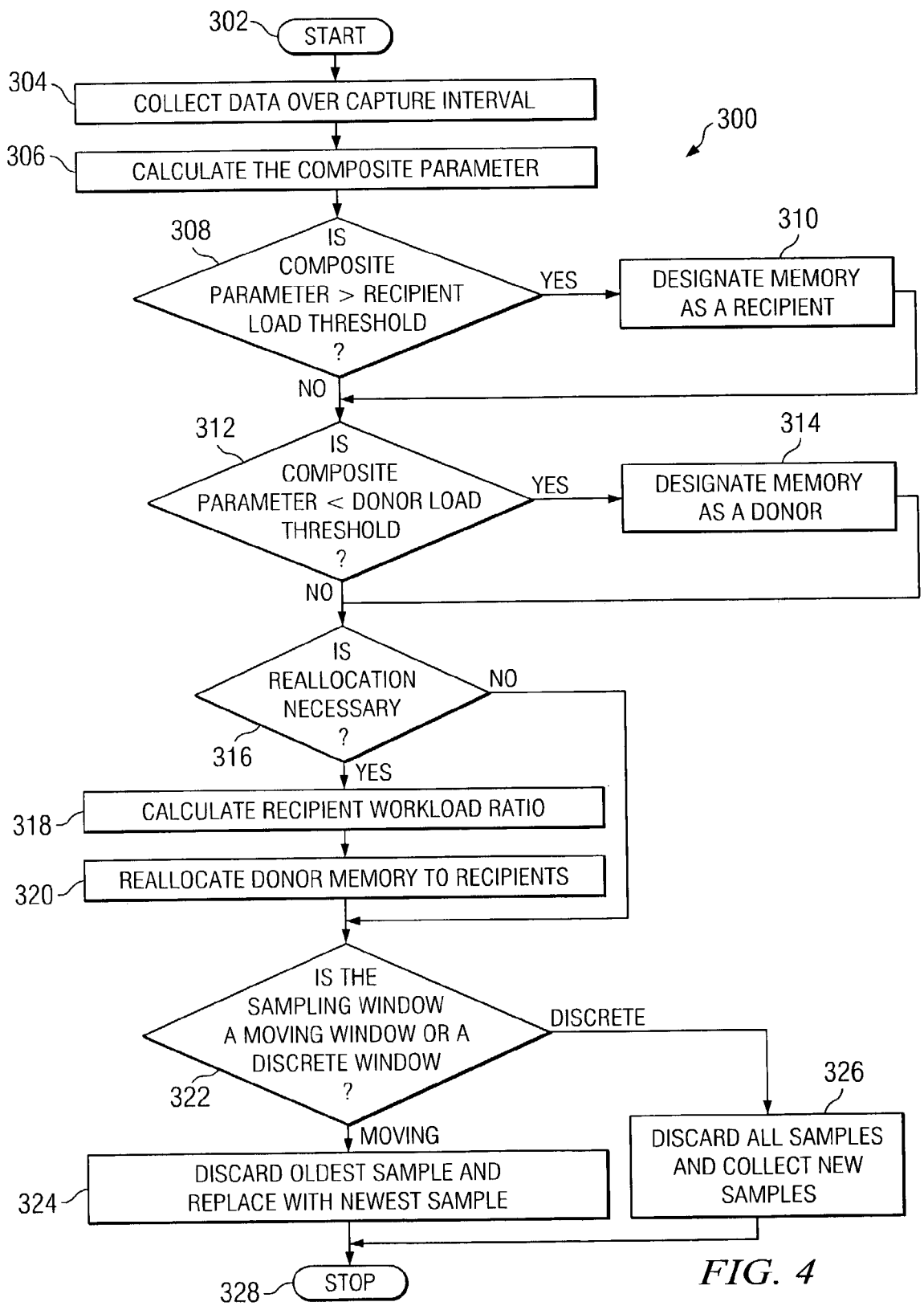
FIG. 4 is an illustration of the Reallocation Program (RP) of the present invention.

Turning to FIG. 4, a flowchart of the logic of RP 300 is illustrated. RP 300 is a program which reallocates the memory. RP 300 starts (302) when prompted by PEP 200. RP 300 collects samples of the memory data at the capture intervals over the sampling interval (304), saving the memory data to a cache memory or hard disk. For example, if the performance parameter is the paging activity, the capture interval is one second, and the sampling interval is five minutes, then RP 300 records the number of pages per second for each memory block for a total of five minutes. After the sampling interval has elapsed, RP 300 then calculates the composite parameter (306). RP 300 calculates the composite parameter by averaging the memory data.

RP 300 then analyzes the recipient candidates and makes a determination whether the composite parameter is greater than the recipient load threshold (308). If the composite parameter is not greater than the recipient load threshold, then RP 300 proceeds to step 312. If the composite parameter is greater than the recipient load threshold, then RP 300 designates that memory as a recipient (310) and proceeds to step 312. RP 300 then analyzes the donor candidates and makes a determination whether the composite parameter is less than the donor load threshold (312). If the composite parameter is not less than the donor load threshold, then RP 300 proceeds to step 316. If the composite parameter is less than the donor load threshold, then RP 300 designates that memory as a donor (314) and proceeds to step 316. RP 300 then makes a determination whether memory reallocation is necessary (316). RP 300 can optionally send the composite parameter to the controlling entity for the determination whether reallocation is necessary. Reallocation will be necessary if there is at least one donor and at least one recipient. If reallocation is not necessary, RP 300 proceeds to step 322.

If at step 316 reallocation is necessary, RP 300 calculates the recipient workload ratio (318). RP 300 then reallocates the donor memory to the recipient memory according to the recipient workload ratio (320). Persons skilled in the art are aware of numerous methods for allocating donor memory among recipient memory. When the memory is reallocated, tasks or applications queued for the recipient memory will be moved to the donor memory. Persons skilled in the art are aware of how to move tasks or applications from one memory to another. RP 300 then proceeds to step 322.

At step 322, RP 300 then makes a determination whether the sampling window is a moving window or a discrete window (322). If the sampling window is a moving window, RP 300 discards the oldest data sample and replaces the oldest data sample with the newest data sample (324). RP 300 then ends (328). If at step 322 the sampling window is a discrete window, RP 300 discards all of the data samples and collects new data samples (326). RP 300 then ends (328).

Figure 5:
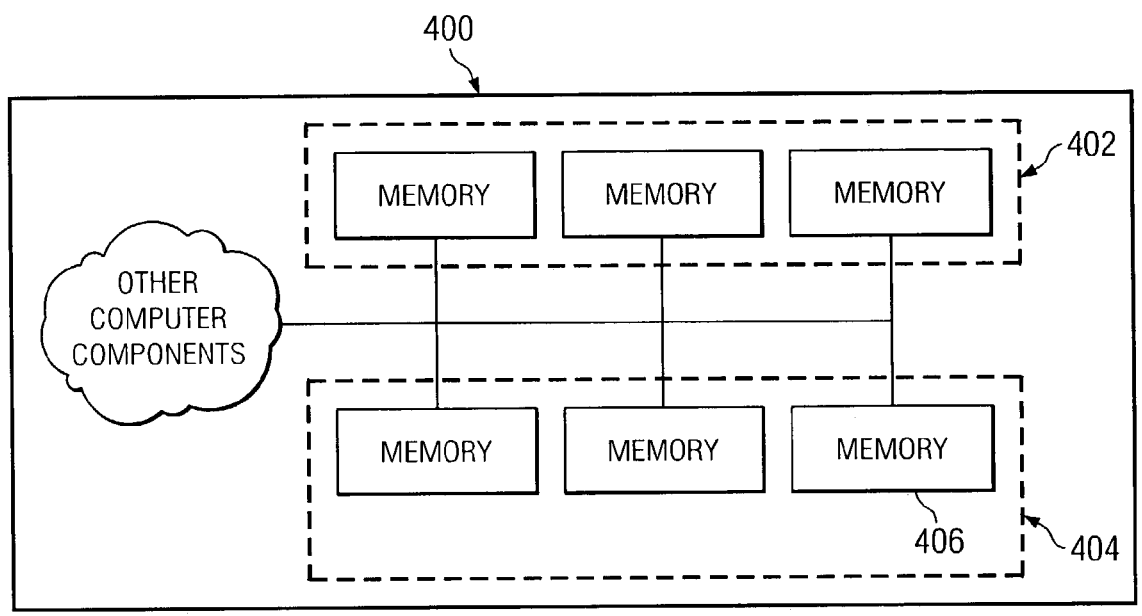
FIG. 5 is an illustration of a logically partitioned system in a single computer before application of the present invention.

PEP 200 and/or RP 300 may be implemented on a managed system which is a single computer, such as a server with a plurality of memory blocks. Turning to FIG. 5, server 400 comprises six memory blocks electrically coupled to other computer components. Persons skilled in the art are aware of the composition of other computer components which may be, for example, processors, devices, device controllers, hard disk drives, floppy disk drives, CD-ROM drives, DVD drives, system connections, system controllers, I/O ports, monitors, user input devices, and the like.

The memory of server 400 is divided by logical partitioning into first virtual system 402 and second virtual system 404. If the memory of first virtual system 402 exceeds the recipient load threshold and the memory of second virtual system 404 is below the donor load threshold, then second virtual system 404 will be eligible to donate a memory block to first virtual system 402. By moving a memory block such as memory 406 to first virtual system 402, memory 406 can be donated to first virtual system 402.

Figure 6:
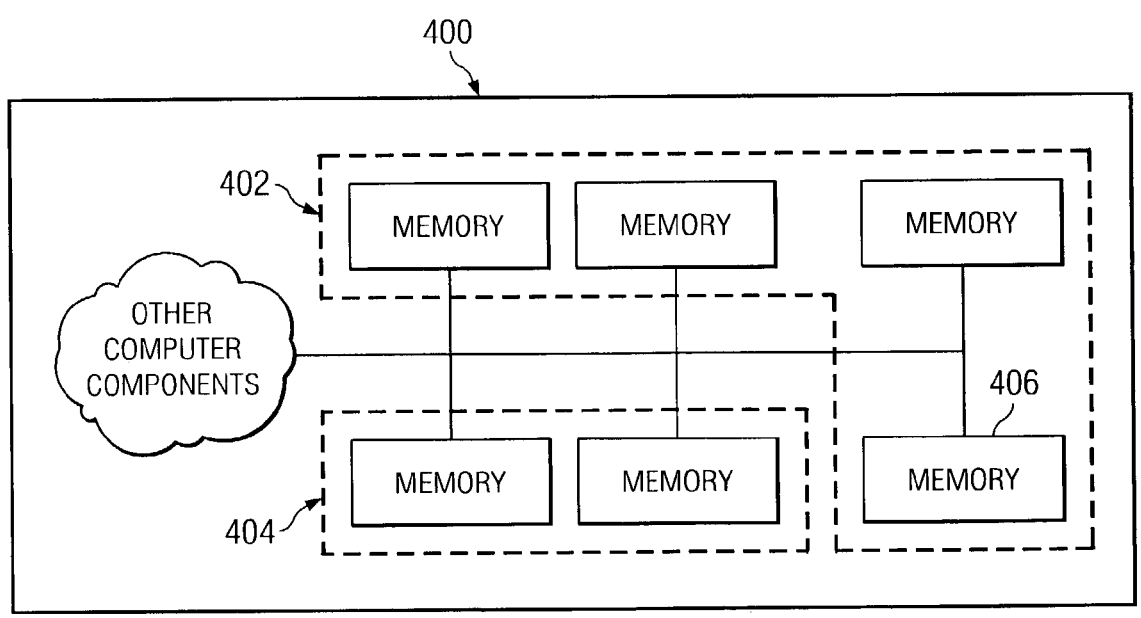
FIG. 6 is an illustration of a logically partitioned system in a single computer after application of the present invention.

Turning to FIG. 6, server 400 has been altered from the illustration in FIG. 5. In FIG. 6, memory 406 has been moved from second virtual system 404 to first virtual system 402 by PEP 200 of the present invention.

Figure 7:
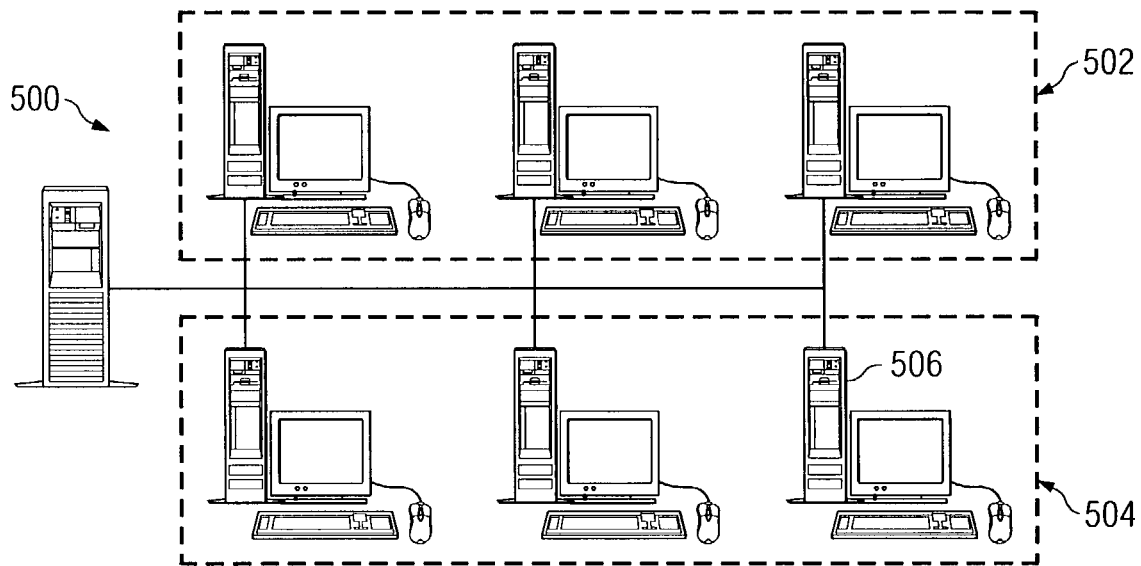
FIG. 7 is an illustration of a logically partitioned virtual system before application of the present invention.

The present invention is not limited in application to computer systems. PEP 200 and/or RP 300 may be implemented on a managed system which is a network of individual computers. Turning to FIG. 7, managed network 500 is divided by logical partitioning into first virtual network 502 and second virtual network 504. If at least one of the computers of first virtual network 502 exceeds the recipient load threshold and at least one of the computers of second virtual network 504 is below the donor load threshold, then second virtual network 504 will be eligible to donate a computer, and therefore memory, to first virtual network 502. By moving a computer such as computer 506 to first virtual network 502, the memory of computer 506 can be donated to first virtual network 502.

Figure 8:
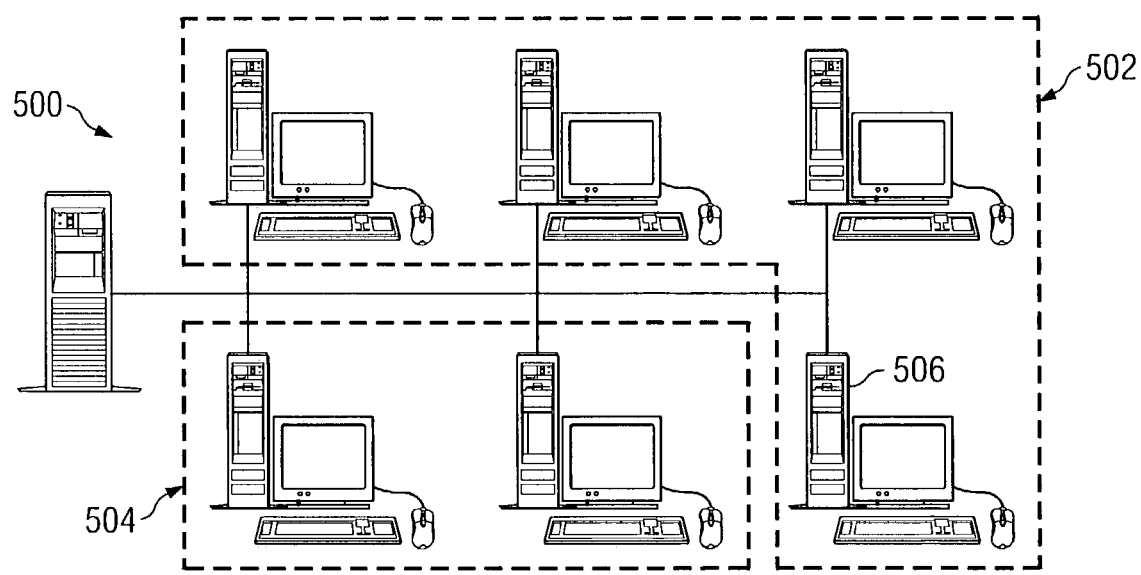
FIG. 8 is an illustration of a logically partitioned virtual system after application of the present invention.

Turning to FIG. 8, managed network 500 has been altered from the illustration in FIG. 7. In FIG. 8, computer 506 has been moved from second virtual network 504 to first virtual network 502 by PEP 200 of the present invention.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. The novel spirit of the present invention is still embodied by reordering or deleting some of the steps contained in this disclosure. The spirit of the invention is not meant to be limited in any way except by proper construction of the following claims.

What is claimed is:

1. A method for automatically reallocating memory among a plurality of logical partitions comprising:
   defining a plurality of donor candidates, wherein each donor candidate is a system designated by a user as eligible to donate memory to another system;
   defining a plurality of recipient candidates, wherein each recipient candidate is a system designated by the user as eligibleto receive memory from another system;
   selecting a performance parameter, wherein the performance parameter is a measure of memory paging activity;
   defining a memory grain;
   defining a capture interval, wherein the capture interval is a first interval of time;
   defining a sampling interval, wherein the sampling interval is a second interval of time at least as long as the first interval of time;
   for each donor candidate and for each recipient candidate, capturing a value of the performance parameter for each capture interval within the sampling interval;
   for each donor candidate and for each recipient candidate, calculating a composite performance parameter equal to an average of the performance parameters captured for said each donor candidate and for said each recipient candidate during the sampling interval;
   defining a donor load threshold, wherein the donor load threshold is a first value of the composite performance parameter;
   defining a recipient load threshold, wherein the recipient load threshold is a second value of the composite performance parameter;
   identifying a donor system, wherein the donor system is a donor candidate with a composite performance parameter below the donor load threshold;
   identifying a recipient system, wherein the recipient system is a recipient candidate with a composite performance parameter greater than the recipient load threshold;
   calculating a recipient workload ratio of the recipient system, wherein the recipient workload ratio is equal to the composite performance parameter of the recipient system divided by the recipient load threshold;
   defining a memory multiplier, wherein the memory multiplier associates the recipient workload ratio of the recipient system with a number of memory grains; and
   reallocating the number of memory grains from the donor system to the recipient system;
   wherein memory paging activity is a number of pages read into a memory over the capture interval;
   wherein the memory grain is a finest granularity of memory which may be reallocated from a donor candidate to a recipient candidate; and
   wherein the memory multiplier is a table associating recipient workload ratios with numbers of memory grains to reallocate, and wherein the number of memory grains to reallocate increases as the recipient workload ratio increases.

2. The method of claim 1 further comprising:
   entering a conditioning interval; and
   suspending reallocation of the memory during the conditioning interval.

3. The method of claim 2 further comprising:
   determining whether reallocation should continue; and
   responsive to said determination, resuming reallocation.

4. The method of claim 1, wherein the sampling window is a moving window, the method further comprising:
   discarding an oldest captured value of the performance parameter and adding a newest captured value of the performance parameter.

5. The method of claim 1, wherein the sampling window is a discrete window, the method further comprising:
   discarding all of the captured values of the performance parameter and collecting new captured values of the performance parameter.

* * * * *